Sept. 13, 1927.

O. HOVDEN 1,642,443

FISH SEGREGATING MECHANISM

Filed July 8, 1925

Inventor
OLAV HOVDEN

By A. B. Bowman
Attorney

Patented Sept. 13, 1927.

1,642,443

UNITED STATES PATENT OFFICE.

OLAV HOVDEN, OF MONTEREY, CALIFORNIA.

FISH-SEGREGATING MECHANISM.

Application filed July 8, 1925. Serial No. 42,211.

My invention relates to a fish segregating means, and the primary object of my invention is to provide improvements over my previous application for Letters Patent for fish beheading and entrail removing machines, filed in the United States Patent Office, July 9, 1923, under Serial Number 650,415. The objects of my improvements are:

First, to provide a segregating means whereby fish are discharged one at a time from a fish supply receptacle into a conveying means;

Second, to provide a fish turning means into which only one fish at a time is permitted to be received and whereby the fish received therein on their backs are discharged on their bellies into a conveying means;

Third, to provide a fish segregating mechanism in combination with a fish supply receptacle and a fish turning means whereby the fish received in quantities on their backs in the fish supply receptacle are discharged one at a time on their backs into the fish turning means, which latter means is timed with the segregating mechanism;

Fourth, to provide a fish segregating mechanism consisting of a substantially upright narrow chute having a plurality of intermittently receding, angularly positioned fish retaining members adapted to support the fish in the chute and intermittently deposit the same in a synchronized conveying means;

Fifth, to provide as a whole a novelly constructed fish segregating mechanism, and also a novel arrangement of a mechanism of this class in combination with a fish turning means, and Sixth, to provide a mechanism of this class which is simple and economical of construction, durable, efficient, and which will not readily deteriorate or get out of order.

Figure 2:
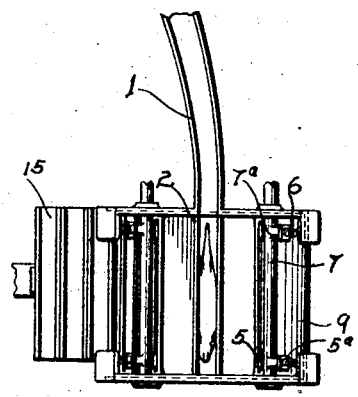
Figure 3:
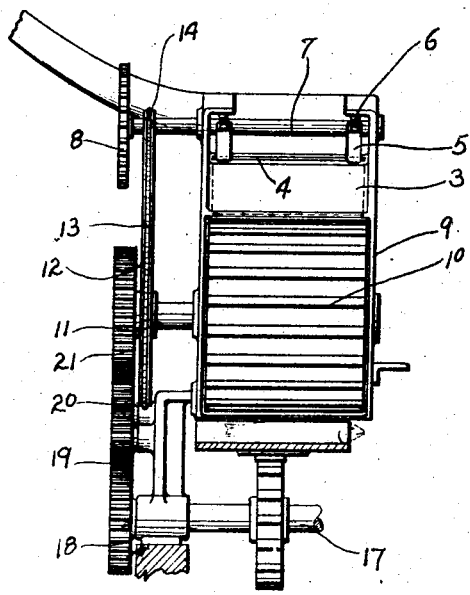
Figure 1:
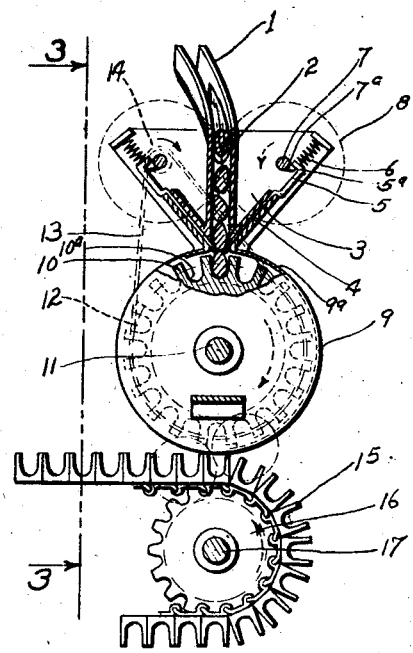

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side elevational view of my fish segregating mechanism in combination with a fish supply means, a fish turning means and a pocket conveyer, certain parts and portions thereof being broken away and in section to facilitate the illustration; Fig. 2 is a plan view thereof, and Fig. 3 is another elevational view thereof, taken at 3—3 of Fig. 1.

Like characters of reference refer to similar parts and portions throughout the several views of the drawings.

My fish mechanism, as illustrated in the drawings, consists essentially of a fish supply chute 1, fish receptacle 2, frames 3, fish retaining members 4, arms 5, compression springs 6, camshafts 7, gears 8, casing 9, fish turning drum 10, shaft 11, sprocket 12, chain 13, sprocket 14, pocket conveyer 15, sprockets 16, shaft 17, and the gears 18, 19, 20 and 21.

The chute 1 is provided with a curved bottom and inclined downwardly from a supply hopper or other means toward the narrow fish receptacle 2 with which the upper end of which the chute 1 connects. Said chute is adapted to turn all of the fish discharged therein onto their backs, which fish are discharged in such a position, one on top of the other, into the, preferably, upright fish receptacle 2. At either side of the receptacle 2 are provided frames 3 at the lower portions of which are reciprocally mounted in angular positions relatively to the receptacle 2, fish retaining members 4 in the form of plates which extend with their lower ends or portions into the lower end of the receptacle 2 but are slightly spaced from each other at said ends, as shown best in Fig. 1. The portions of the plates 4 extending into the lower end of the receptacle 2 are adapted to substantially support the fish positioned one on top of the other in the receptacle 2 and permit only one fish at a time to be discharged therefrom into the transversely arranged pockets $10^a$ in the periphery of the fish turning drum 10, which is mounted on a shaft 11 and positioned within a casing 9 positioned directly below the receptacle 2 and provided at one side of its peripheral portion with a circular fish retaining wall $9^a$. The fish retaining plates 4 are provided near their lateral ends with outwardly extending arms 5 having offset or right angle portions $5^a$ at their outer ends which are adapted to be engaged at their inner sides by cam portions $7^a$ of camshafts 7 revolubly mounted in the frames 3. Between the outer ends of the arms 5 and lugs on the frames 3 are positioned compression springs 6 which are adapted to retain the fish retaining plates 4 in their inward positions, the inward positions of said plates being limited by lug means at the outer edges thereof or enlarged offset portions at the inner ends of the arms 5 as shown in Fig. 1. The ends of the shafts 7 are connected with each other by means of gears 8.

Below the fish turning drum 10 and the casing 9, partially surrounding the periphery thereof, is positioned an endless pocket conveyer 15 which is mounted at its ends (only one end being shown) on sprockets 16 mounted on shafts 17. The shaft 17 at the rear end of the conveyer is provided with a gear 18 which drives, by means of two intermediate gears 19 and 20, a gear 21 secured to the shaft 11 on which the drum 10 is mounted. On the shaft 11 is also mounted a large sprocket 12 which is connected, by means of a chain 13, with a small sprocket 14 mounted on one of the camshafts 7.

The simultaneous reciprocation of the fish retaining plates 4, the rotation of the fish turning drum 10, and the movement of the pocket conveyer 15 are synchronized or timed with each other in such a manner that when the cams 7ª of the camshafts 7 are rotated in the directions of the arrows, the plates 4 are simultaneously drawn outwardly permitting the lowest fish in the receptacle 2 to be deposited into one of the transverse pockets in the periphery of the drum 10, the plate 4 being instantly returned, by means of the compression springs 6, to the position shown by solid lines in Fig. 1 for retaining the next fish. The fish deposited on their backs into the pockets of the drum 10, as stated, are shifted to a diametrically opposite position from the axis of the drum and are thence discharged at the lower end of the circular outer wall 9ª of the casing 9, on their bellies, into the pockets of the conveyer 15. It will be here noted that as the fish are discharged from the receptacle 2 into the pockets of the drum 10, the lower fish in the receptacle 2 may rest wholly, or only to a certain extent, upon the fish already discharged into the pockets of the drum 10 before the plates 4 are returned to their supporting positions within the receptacle 2. These plates 4, however, are so positioned that the same are projected below and retain the lower fish within the receptacle 2 while the drum 10 is rotated so that the next pocket is positioned below the receptacle 2.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a mechanism of the class described, a substantially upright chute, a pair of means extending into the lower portion of said chute from the opposite sides thereof, and extending toward each other, and means for intermittently and simultaneously withdrawing said means from the interior of said chute.

2. In a mechanism of the class described, a substantially upright chute, means extending into the lower portion of said chute from the opposite sides thereof and provided with inclined surfaces at the portions extending into said chute, and means for intermittently withdrawing said means from the interior of said chute.

3. In a mechanism of the class described, a substantially narrow chute, and angularly positioned retaining members reciprocally mounted at the lower portion and at either side thereof, the ends of said retaining members extending toward each other into the path directed through said chute.

4. In a mechanism of the class described, a substantially narrow chute, angularly positioned retaining members reciprocally mounted at the lower portion and at either side thereof, the ends of said retaining members extending toward each other into the path directed through said chute, cam means for intermittently withdrawing said retaining members, and spring means for normally retaining said retaining members in inwardly shifted positions.

5. In a segregating mechanism, a substantially narrow chute, fish retaining members positioned angularly at the opposite long sides of said chute and reciprocally mounted relatively thereto, their adjacent ends being slightly spaced from each other, cam means for intermittently withdrawing said retaining members from said chute, and spring means for normally retaining said retaining members with their ends positioned within said chute.

6. In a mechanism of the class described, a revoluble drum provided with transverse pockets in its periphery, guide means surrounding a portion of the periphery of said drum, a narrow receptacle terminating at its one end at the upper portion of said drum and positioned with its main axis parallel with the axis of said drum, an intermittently retaining member mounted at the lower portion of said receptacle and normally extending into the same, and means for withdrawing said retaining member from said receptacle when one of the pockets in said drum is positioned in alinement with the lower portion of said receptacle.

7. In a mechanism of the class described, a revoluble drum provided with transverse pockets in its periphery, guide means surrounding a portion of the periphery of said drum, a narrow receptacle terminating at its one end at the upper portion of said drum and positioned with its main axis parallel with the axis of said drum, an intermittently retaining member mounted at the lower portion of said receptacle and normally extending into the same, means for withdrawing said retaining member from said receptacle when one of the pockets in said drum is positioned in alinement with the lower portion of said receptacle, and means connected with the upper portion of said receptacle for depositing fish on their backs therein, one on top of the other.

8. In a mechanism of the class described, a revoluble drum provided with transverse pockets in its periphery, guide means surrounding a portion of the periphery of said drum, a relatively narrow receptacle positioned above and extending upwardly from the upper portion of said drum, and intermittently operable retaining means at the lower end of said receptacle adapted to be withdrawn therefrom when the pockets in said drum are in substantial alinement with the lower end of said receptacle.

9. In a mechanism of the class described, a revoluble drum provided with transverse pockets in its periphery, guide means surrounding a portion of the periphery of said drum, a substantially upright narrow receptacle terminating at its lower end contiguous to the periphery of said drum at its upper portion and positioned relatively thereto to aline with the pockets in said drum, and a pair of retaining members positioned angularly and reciprocally mounted in the oppositely positioned, long side walls of said receptacle and extending normally in said receptacle at an angle relatively to the side walls thereof.

10. In a mechanism of the class described, a revoluble drum provided with transverse pockets in its periphery, guide means surrounding a portion of the periphery of said drum, a substantially upright narrow receptacle terminating at its lower end contiguous to the periphery of said drum at its upper portion and positioned relatively thereto to aline with the pockets in said drum, a pair of retaining members positioned angularly and reciprocally mounted in the oppositely positioned, long side walls of said receptacle and extending normally in said receptacle at an angle relatively to the side walls thereof, and means for intermittently withdrawing said retaining members from said receptacle when the pockets in said drum are in substantial alinement with the lower end of said receptacle.

In testimony whereof, I have hereunto set my hand at Monterey, California, this 4th day of June, 1925.

OLAV HOVDEN.